US00RE43796E

(19) United States
(12) Reissued Patent
Kubota et al.

(10) Patent Number: US RE43,796 E
(45) Date of Reissued Patent: Nov. 6, 2012

(54) RECEPTACLE CONNECTOR

(75) Inventors: Yoshifumi Kubota, Tokyo (JP); Yoshihide Kuroki, Tachikawa (JP); Masahide Watanabe, Akiruno (JP)

(73) Assignee: Apple Inc., Cupertino, CA (US)

(21) Appl. No.: 12/613,482

(22) Filed: Nov. 5, 2009

Related U.S. Patent Documents

Reissue of:
(64) Patent No.: 6,776,660
Issued: Aug. 17, 2004
Appl. No.: 10/426,218
Filed: Apr. 30, 2003

(51) Int. Cl.
*H01R 13/64* (2006.01)

(52) U.S. Cl. ..... 439/677; 439/680; 439/607.36

(58) Field of Classification Search ..... 439/607.35, 439/607.36, 607.4, 108, 677, 680, 681
See application file for complete search history.

(56) References Cited

U.S. PATENT DOCUMENTS

| | | | |
|---|---|---|---|
| 4,508,756 | A | 4/1985 | Senda et al. |
| 4,567,608 | A | 1/1986 | Watson et al. |
| 4,850,899 | A | 7/1989 | Maynard |
| 5,055,069 | A | 10/1991 | Townsend et al. |
| 5,080,603 | A | 1/1992 | Mouissie |
| 5,104,243 | A | 4/1992 | Harding |
| 5,108,313 | A | 4/1992 | Adams |
| 5,186,646 | A | 2/1993 | Pederson |
| 5,235,217 | A | 8/1993 | Kirton |
| 5,267,881 | A | 12/1993 | Matuzaki |
| 5,277,624 | A | 1/1994 | Champion |
| 5,344,335 | A | 9/1994 | Scholz et al. |
| 5,425,650 | A | 6/1995 | Maeda |
| 5,586,893 | A | 12/1996 | Mosquera |
| 5,660,558 | A | 8/1997 | Osanai et al. |
| 5,697,817 | A | 12/1997 | Bouchan et al. |
| D390,828 | S | 2/1998 | Aramaki |
| 5,830,001 | A | 11/1998 | Kinoshita |
| 5,901,049 | A | 5/1999 | Schmidt et al. |
| 5,934,942 | A | 8/1999 | Patel et al. |
| 5,975,957 | A | 11/1999 | Noda et al. |
| 5,990,758 | A | 11/1999 | Matsubara |
| 6,053,773 | A | 4/2000 | Wu |
| 6,116,943 | A | 9/2000 | Ferrill et al. |

(Continued)

FOREIGN PATENT DOCUMENTS

CN 1282124 A2 1/2001

(Continued)

OTHER PUBLICATIONS

Derman, Glenda; Monitors Make Net Connections; *Electronic Engineering Times;* 1996; pp. 60 and 69, vol. 933.

(Continued)

*Primary Examiner* — Ross Gushi
(74) *Attorney, Agent, or Firm* — Kilpatrick Townsend & Stockton LLP

(57) ABSTRACT

A connector including a first connector element and a second connector element that are coupled into a single unit, in which the first connector element has an engagement projection that projects interior of the first connector element and extends in the direction of the depth of the first connector element so that the front end of the engagement projection is spacedly apart from the front edge of the first connector element, and the second connector element is formed with an engagement slit that extends in the direction of depth of the second connector element and engages with the engagement projection of the first connector element.

25 Claims, 6 Drawing Sheets

U.S. PATENT DOCUMENTS

| | | | |
|---|---|---|---|
| 6,154,798 | A | 11/2000 | Lin et al. |
| 6,203,345 | B1 | 3/2001 | Roque et al. |
| 6,206,480 | B1 | 3/2001 | Thompson |
| 6,267,623 | B1 | 7/2001 | Hisamatsu |
| 6,319,061 | B1 | 11/2001 | Chen et al. |
| 6,322,396 | B1 | 11/2001 | Kuan |
| 6,344,727 | B1 | 2/2002 | Desai et al. |
| 6,354,713 | B1 | 3/2002 | Leifer et al. |
| 6,356,084 | B1 | 3/2002 | Levine |
| 6,358,089 | B1 | 3/2002 | Kuroda et al. |
| 6,431,915 | B1 | 8/2002 | Ko |
| 6,454,592 | B2 | 9/2002 | Takagi |
| 6,461,173 | B1 | 10/2002 | Mizuno et al. |
| 6,464,542 | B1 | 10/2002 | Lee |
| 6,468,110 | B2 | 10/2002 | Fujino et al. |
| 6,478,603 | B1 | 11/2002 | Wu |
| 6,485,328 | B1 | 11/2002 | Wu |
| 6,524,119 | B2 | 2/2003 | Kato et al. |
| 6,570,756 | B2 | 5/2003 | Alfonso et al. |
| 6,577,877 | B1 | 6/2003 | Charlier et al. |
| 6,585,540 | B2 | 7/2003 | Gutierrez et al. |
| 6,591,085 | B1 | 7/2003 | Grady |
| 6,607,397 | B1 | 8/2003 | Zhang et al. |
| 6,608,264 | B1 | 8/2003 | Fouladpour |
| 6,616,473 | B2 | 9/2003 | Kamata et al. |
| 6,619,986 | B1 | 9/2003 | Yeh |
| 6,653,813 | B2 | 11/2003 | Khatri |
| 6,728,546 | B1 | 4/2004 | Peterson et al. |
| 6,776,626 | B2 | 8/2004 | Huang et al. |
| 6,776,665 | B2 | 8/2004 | Huang |
| 6,813,528 | B1 | 11/2004 | Yang |
| 6,816,376 | B2 | 11/2004 | Bright et al. |
| 6,835,091 | B2 | 12/2004 | Oleynick et al. |
| 6,840,807 | B2 | 1/2005 | Ooya et al. |
| 6,859,854 | B2 | 2/2005 | Kwong |
| 6,973,658 | B2 | 12/2005 | Nguyen |
| 6,991,483 | B1 | 1/2006 | Milan |
| 6,997,733 | B2 | 2/2006 | Peng |
| 7,004,787 | B2 | 2/2006 | Milan |
| 7,056,153 | B2 | 6/2006 | Watanabe et al. |
| 7,114,988 | B2 | 10/2006 | Sato et al. |
| 7,221,284 | B2 | 5/2007 | Scherer et al. |
| 7,284,036 | B2 | 10/2007 | Ramaswamy |
| 7,303,438 | B2 | 12/2007 | Dawiedczyk et al. |
| 7,396,591 | B2 | 7/2008 | Miyashita et al. |
| 2002/0010759 | A1 | 1/2002 | Hitson et al. |
| 2002/0029303 | A1 | 3/2002 | Nguyen |
| 2002/0065074 | A1 | 5/2002 | Cohn et al. |
| 2002/0103008 | A1 | 8/2002 | Rahn et al. |
| 2002/0115480 | A1 | 8/2002 | Haung |
| 2002/0151327 | A1 | 10/2002 | Levitt |
| 2002/0156546 | A1 | 10/2002 | Ramaswamy |
| 2003/0008553 | A1 | 1/2003 | Oleynick et al. |
| 2003/0028664 | A1 | 2/2003 | Tan et al. |
| 2003/0073432 | A1 | 4/2003 | Meade |
| 2004/0090998 | A1 | 5/2004 | Chen |
| 2004/0186935 | A1 | 9/2004 | Bell et al. |
| 2004/0224638 | A1 | 11/2004 | Fadell |
| 2004/0235339 | A1 | 11/2004 | Sato et al. |
| 2005/0014536 | A1 | 1/2005 | Grady |
| 2005/0239333 | A1 | 10/2005 | Watanabe et al. |
| 2006/0001700 | A1 | 1/2006 | Bertelsen |

FOREIGN PATENT DOCUMENTS

| | | | |
|---|---|---|---|
| CN | 1368768 | A | 9/2002 |
| DE | 10104288 | C1 | 4/2002 |
| EP | 805523 | A2 | 11/1997 |
| JP | H07-176351 | | 7/1995 |
| JP | 10-321302 | A | 12/1998 |
| JP | 10-334993 | A | 12/1998 |
| JP | 1049198 | S | 9/1999 |
| JP | 1075497 | S | 6/2000 |
| JP | 2000-223215 | A | 8/2000 |
| JP | 2000-223216 | A | 8/2000 |
| JP | 2000-223218 | A | 8/2000 |
| JP | 2001-35603 | A | 2/2001 |
| JP | 2001-196133 | A | 7/2001 |
| JP | 2001-230021 | A | 8/2001 |
| JP | 1156347 | S | 10/2002 |
| JP | 1163316 | S | 1/2003 |
| JP | 1185626 | S | 9/2003 |
| JP | 1185627 | S | 9/2003 |
| JP | 1228505 | S | 1/2005 |
| KR | 193346 | S | 2/1997 |
| WO | WO 97/39610 | A | 10/1997 |

OTHER PUBLICATIONS

Lewis, Peter; "On Technology"; *Fortune Magazine,* Jul. 8, 2002, p. 240.

'iPodDock/iPod Cradle', www.bookendz/dock_cradle.htm, downloaded Feb. 27, 2003, 2 pages.

Neuros MP3 Digital Audio Computer; www.neurosaudio.com, downloaded Apr. 9, 2003, 6 pages.

FIG. 4 (Amended)
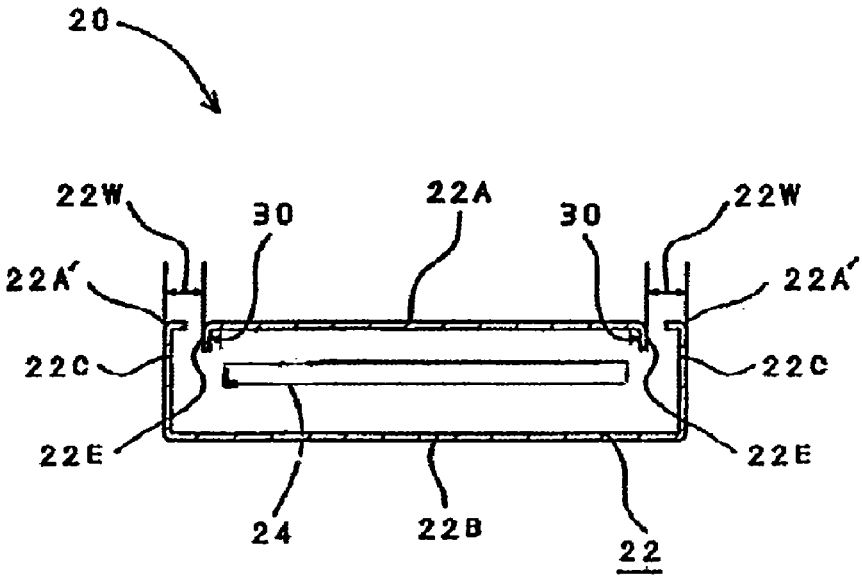

FIG. 7 (Amended)
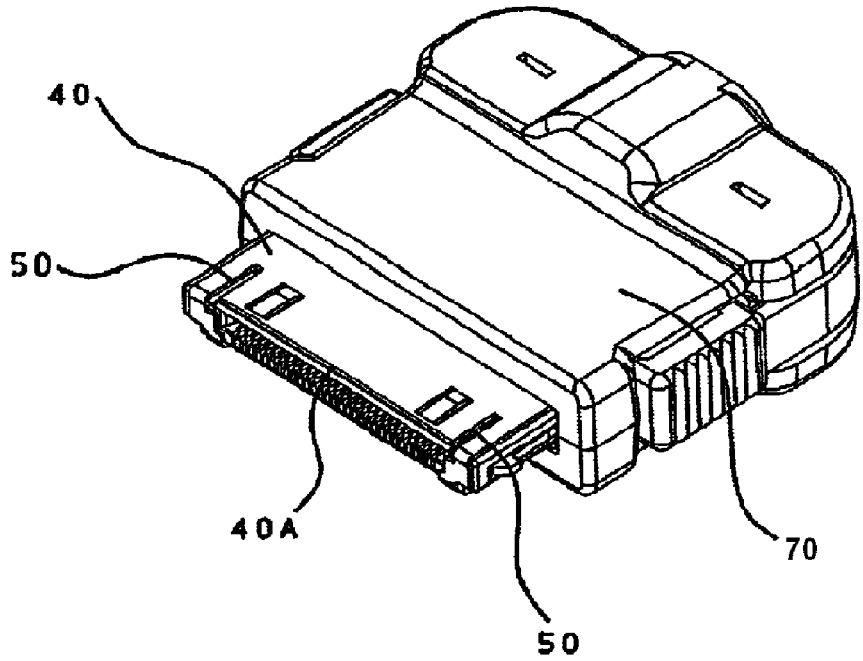
FIG. 9 (Amended)
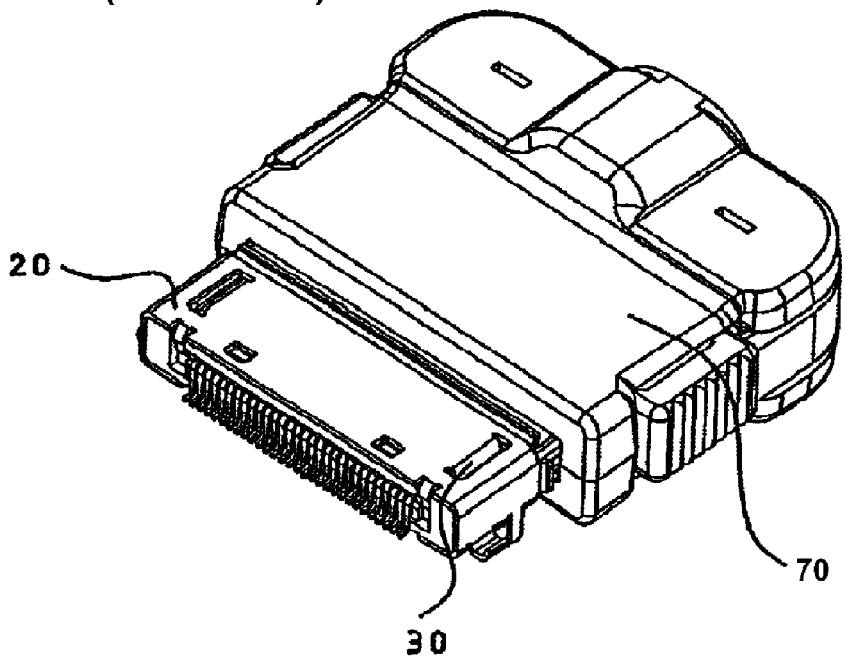

RECEPTACLE CONNECTOR

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,776,660. The reissue applications are application Ser. Nos. 11/334,820 and 29/318,045, (the present application) all of which are continuation reissues of Ser. No. 11/334,820.*

BACKGROUND OF THE INVENTION

1. Field of the Invention

The present invention relates to a connector and more particularly to an electrical connector used in, for instance, small size electrical appliances.

2. Prior Art

In for instance, computer related electronic appliances, the electrical connections including connections to an AC adapter, to interfaces, etc. are made in many different ways. Such electrical connections are typically made by connectors that substantially comprise a receptacle (female) side connector element and a plug (male) side connector element that is brought into the receptacle side connector and coupled thereto for making electrical connection in between so that pin-shaped electrodes installed in the connector elements are connected.

More specifically, connectors typically include in their metal shells a plurality of pins (or terminals) that are arranged in parallel in their longitudinal directions and positionally secured by insulator material such as polyamide, LCP (liquid crystalline polymer), etc. The pins in the receptacle and plug side connector elements are spacedly arranged side by side in the direction in which the connector elements are mated together.

Upon making connection of the plug side connector element into the receptacle side connector element, it is necessary that respective pins in two connector elements be aligned to be on a straight line. In other words, it is necessary to avoid the connector elements from being oblique to each other when they are brought together at their front edges for connection. If the plug side connector element in an oblique posture with reference to the receptacle side connector element, as shown in FIG. 10, is pushed into the receptacle side connector element, an irregular pin connection is made (as at 100) as seen from the enlarged view shown in the circle in FIG. 10, and this would cause several problems including short-circuiting.

In addition, when the plug side connector element is connected to the receptacle connector element in a slanted posture (which can easily occur when there is size differences between the receptacle and plug side connector elements), removing of the plug side connector element from the receptacle side connector element is not easily done and occasionally requires forcible and repeated twists on the shell of the plug side connector element This would cause damage to the pins and the shells of both connector elements.

Thus, though pin alignment is essential when connection is made between the two connector elements, such a pin alignment is not obtained easily and this difficulty can occur often when the connector is small in size and used in small size electrical devices such as a personal digital assistance (PDA), digital cameras, camcorders, etc.

SUMMARY OF THE INVENTION

Accordingly, the object of the present invention is to provide an electrical connector that allows accurate and secure connections or coupling between connector elements to be made easily without causing pin or electrode misalignment.

The above object is accomplished by a unique structure of the present invention for a connector that comprises a first connector element and a second connector element that are coupled together when the second connector element is fitted in the first connector element, and in the present invention:

- the first connector element is formed with an engagement projection that extends in the direction of the depth of the first connector element, the front end of the engagement projection being spacedly apart from the front edge of the first connector element; and
- the second connector element is formed with an engagement slit or slot that extends in the direction of the depth of the second connector element so that the engagement slit receives therein the engagement projection of first connector element when the first and second connector elements are connected.

With the structure above, upon connecting the second connector element to the first connector element, the front end of the engagement slit of the second connector element engages with the engagement projection of the fist connecting element after the front end of the engagement slit has advanced the distance between the front edge of the first connector element and the front end of the engagement projection, and then the second connector element is pushed all the way to back of the first connector element in the depth of the first connector element while being guided by the engagement slit engaging with the engagement projection. Accordingly, even when the second connector element is obliquely pushed into the first connector element at the initial stage of coupling process, such oblique posture is corrected by the engagement projection of the first connector element as the second connector element is pushed and advanced to the back of the first connector element, and a connection between the first and second connector elements with the pins (electrodes) inside both of them being aligned straight can be made assuredly.

BRIEF DESCRIPTION OF THE DRAWINGS

FIG. 4 schematically shows the cross section of the first connector body taken along the line 44 in FIG. 3;

FIG. 7 illustrates the second connector body which is combined with a plug assembly, FIG. 9 illustrates the first connector body to which the second connector body (not seen) is connected.

DETAILED DESCRIPTION OF THE INVENTION

The connector of the present invention is comprised of a first connector body 20 (a receptacle side connector element) and a second connector body 40 (a plug side connector element).

Figure 1:
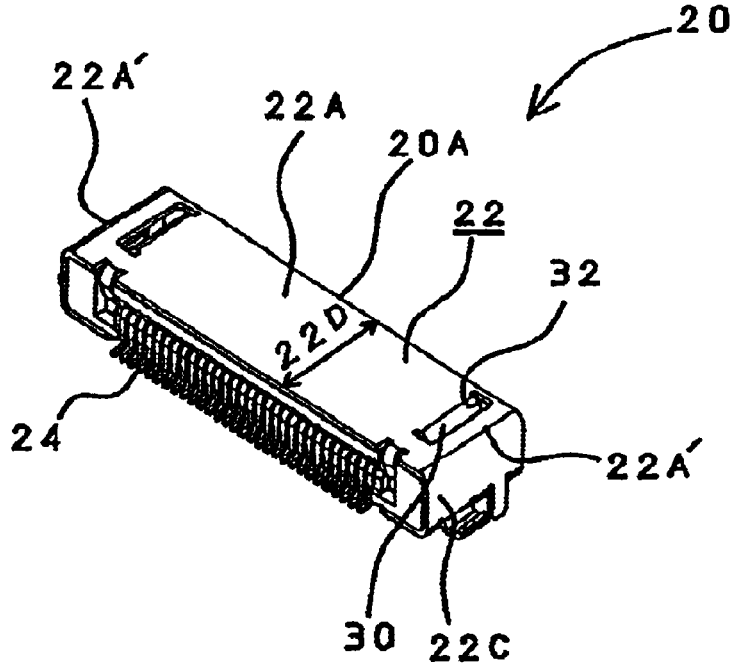
FIG. 1 is a perspective view of the first connector body (first connector element) of the connector according to the present invention.
Figure 2:
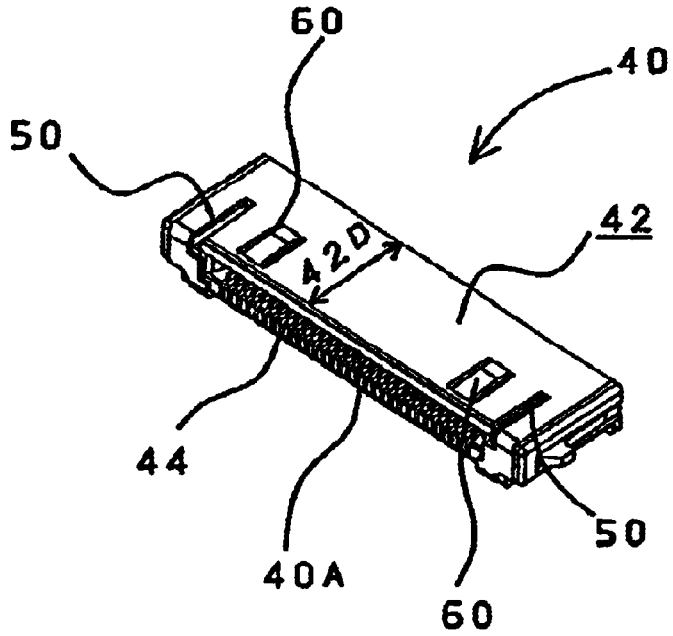
FIG. 2 is a perspective view of the second connector body (second connector element) of the connector according to the present invention.

As seen from FIGS. 1 and 2, the first and second connector bodies 20 and 40 comprise respectively a relatively flat box shape shell 22 and 42 made of a metal and include therein a plurality of pins or elongated electrodes, which are collectively referred to by the reference numerals 24 and 44 respectively, and an insulating material (not shown) is filled therein so as to positionally secure the pins 24 and 44.

Figure 3:
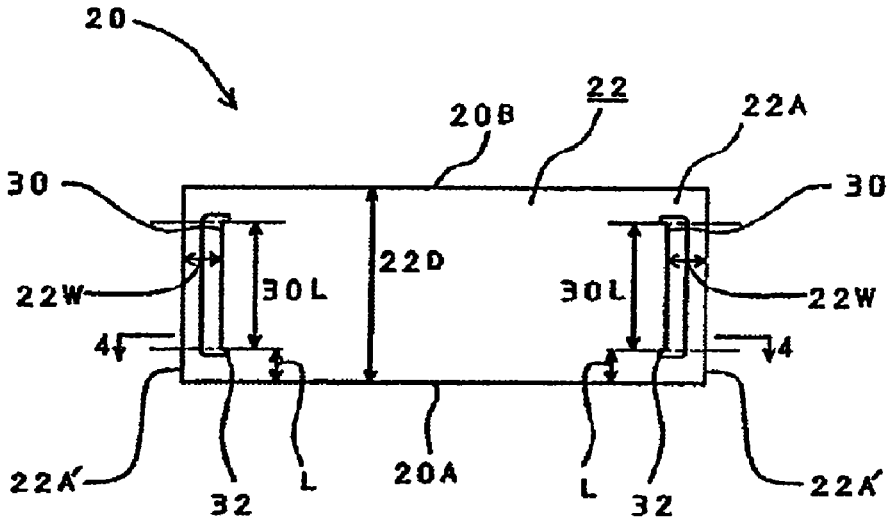
FIG. 3 is a schematic top view of the first connector body.
Figure 5:
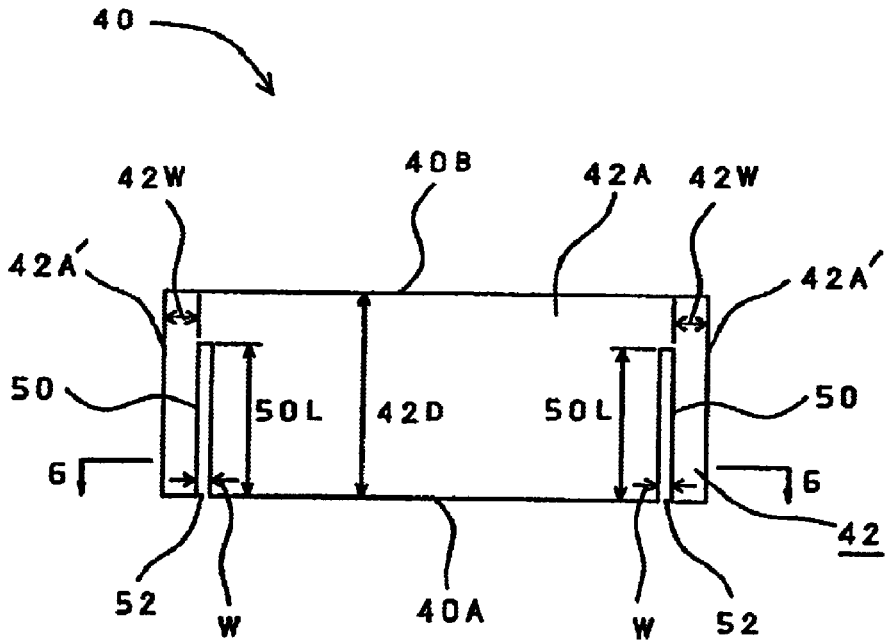
FIG. 5 is a schematic top view of the second connector body.

The shell 22 of the first connector body 20 comprises, as best seen from FIG. 4, a top shell plate 22A and a bottom shell plate 22B as well as side shell plates 22C, thus forming a box shape that has a predetermined depth 22D (see FIG. 3) that extends from the front edge 20A to the rear edge 20B of the first connector body 20. The pins 24 of the first connector body 20 are arranged parallel to the direction of the depth 22D.

The shell 22 of the first connector 20 is formed in its top shell plate 22A with engagement projections 30. Each of the projections 30 is formed by cutting the top shell plate 22A in an angled C shape, and the resulting tongue pieces 22E are bent inward toward the interior of the shell 22. The tongue pieces 22E are in the shape of elongated parts of the shell 22 that extend in the direction of the depth 22D of the first connector body 20, and they are parallel to the side shell plates 22C of the first connector body 20 or to the side edges 22A' of the top shell plate 22A.

The tongue pieces 22E are bent at locations of distance 22W from the side shell plates 22C or from the side edges 22A' of the first connector body 20 to make the engagement projections 30. The engagement projections 30 are provided with a space of a distance L apart from the front edge 20A of the first connector body 20. In other words, the front ends 32 of the engagement projections 30 are spaced apart from the front edge 20A of the first connector body 20. The engagement projections 30 have a length 30L which is, in the shown embodiment, about two third the depth 22D of the first connector body 20.

Figure 6:
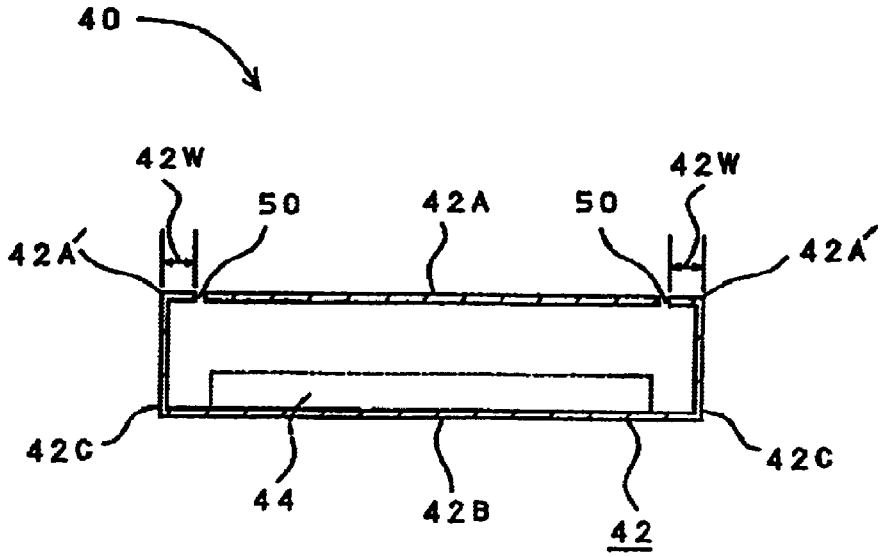
FIG. 6 schematically shows the cross section of the second connector body taken along the line 6-6 in FIG. 5.

On the other hand, the shell 42 of the second connector body 40 comprises, as best seen from FIG. 6, a top shell plate 42A and a bottom [shall] *shell* plate 42B as well as side shell plates 42C, thus forming a box shape with a predetermined depth 42D (see FIG. 6) that extends from the front edge 40A to the rear edge 40B of the second connector body 40. The overall size of the shell 42 of the second connector 42 is slightly smaller than the shell 22 of the first connector body 20 so that the second connector body 40 is fitted in the first connector body 20 from the front side of the first connector body 20. The pins 44 of the second connector body 40 are arranged so be parallel to the direction of the depth 42D.

The shell 42 of the second connector body 40 is formed in its top shell plate 42A with engagement slits 50. Each of the engagement slits 50 is formed by cutting away parts of the top shell plate 42A linearly so that the engagement slits 50 are parallel to and adjacent to the side plates 42C or to side edges 42A' of the top shell plate 42A. An alternate construction would be to mold the slits 50 into the shell 42 when the shell 42 is made. The engagement slits 50 are provided so as to extend in the direction of depth 42D of the shell 42 of the second connector body 40. In other words, the front end ends 52 of the engagement slits 50 are on the front edge 40A of the second connector body 40. The engagement slits 50 have a length 50L which is, in the shown embodiment, about two thirds of the depth 42D of the second connector body 40 and is slightly larger in length than the engagement projections 30 of the first connector body 20.

The engagement slits 50 are opened at locations of distance 42W from the side shell plates 42C or from the side edges 42A' of the top shell plate 42A of the second connector body 40, the distance 42W being substantially the same as the distance 22W of the engagement projections 30 of the first connector body 20. Thus, the engagement slits 50 positionally correspond to the engagement projections 30 of the first connector body 20. The width W of the engagement slits 50 is substantially the same as (or slightly larger than) the thickness of the tongue pieces 22E (engagement projections 30) which is the thickness of the metal material of the shell 22 of the first connector body 20.

The reference numerals 60 shown in FIG. 2 are raised springy holders formed by notching the top shell plate 42A of the second connector body 40 and raised outwardly.

The first and second connector bodies 20 and 40 structured as described above are connected by way of mating together at the front ends of the shells 22 and 42.

More specifically, as shown in FIG. 7, the second connector body 40, which is attached at its rear edge 40B to, typically, a plug assembly [60] *70* that is connected to, for instance, an electrical cable (not shown), is held by hand, and then it is brought to the vicinity of the first connector body 20 which is installed in a casing body of, for instance, a PDA (not shown).

The front edge 40A of the second connector body 40, which is a plug side connector element, is set so as to face the front edge 20A of the first connector body 20, which is a receptacle side connector element, so that the first and second connector bodies 20 and 40 are aligned in the direction of the depth thereof (which brings an alignment of the pins 24 and 44 installed in such connector bodies 20 and 40). In this positioning, since the distances 22W and 42W of the first and second connector bodies 20 and 40 are substantially equal, the engagement projections 30 of the first connector body 20 and the engagement slits 50 of the second connector body 40 are also aligned on imaginary straight lines.

Figure 8:
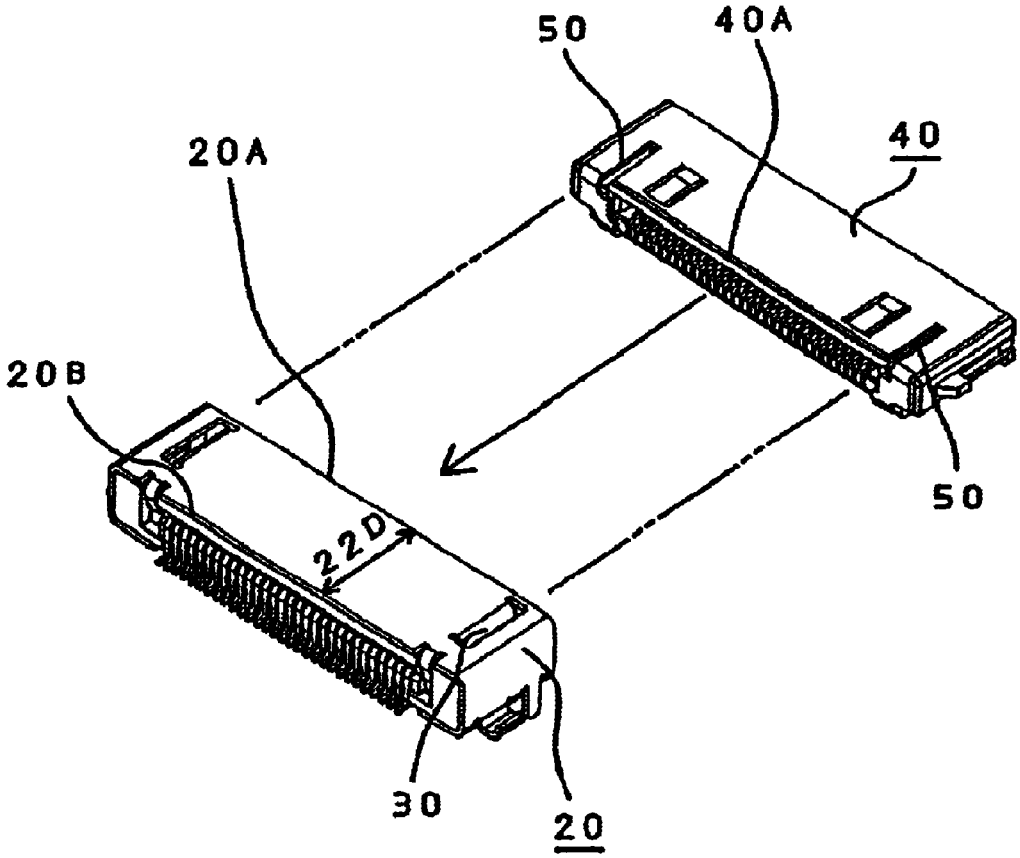
FIG. 8 illustrates the manner of connecting the second connector body to the first connector body.
Figure 10:
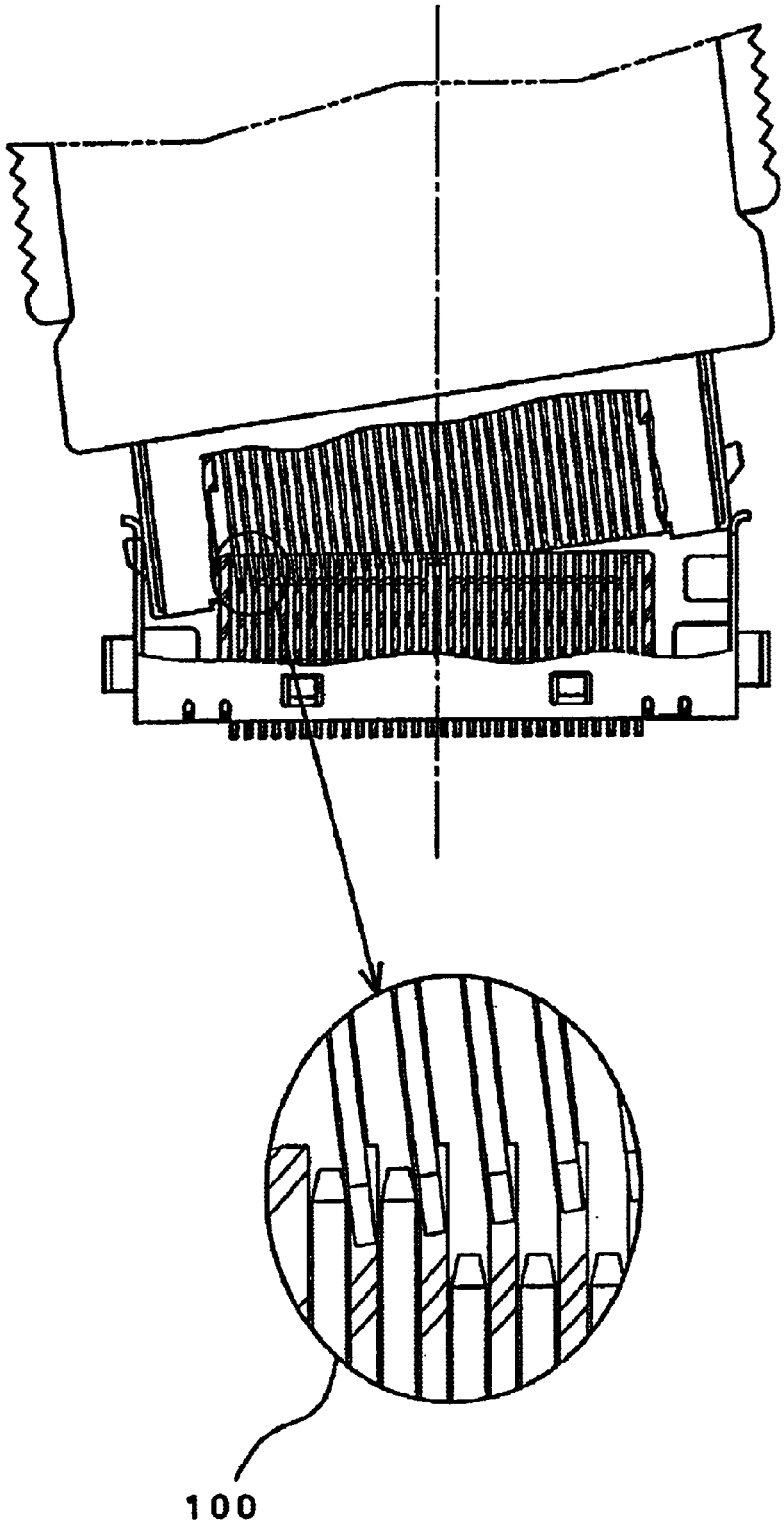
FIG. 10 PRIOR ART
FIG. 10 illustrates the manner of oblique connection of the first and second connector elements in prior art connector.

Then, the second connector body 40 is pushed into the first connector body 20 as shown by arrow in FIG. 8. During the initial pushing movement, the outer surfaces of the shell 42 of the second connector body 40 are guided by the inner surfaces of the shells 22 of the first connector body 20. After advancing the distance L which is the distance from the front edge 20A to the front ends 32 of the engagement projections 30 in the first connector body 20, the engagement slits 50 of the second connector body 40 come into engagement with the engagement projections 30 of the first connector body 20. As a result, the sliding movement of the second connector body 40 in the depth 22D of and toward the rear edge 20B of the first connector body 20 is guided by the engagement projections 30. The second connector body 40 is thus pushed into the first connector body 20 straight with the pins inside both connector bodies aligned straight as well and connected to the first connector body 20 (see FIG. 9, in which the second connector body 40 is unseen since it is inside the first connector body 20). The second connector body 40 is held inside the first connector body 20 by the raised springy holders 60 that press against the inside surface of the top shell plate 22A of the first connector body 20.

The width W of each engagement slit 50 is substantially the same as (or slightly larger than) the thickness of the engagement projection 30, and thus the engagement projections 30 have substantially no space for play in the direction perpendicular to the direction of the length of the engagement slits 50 or to the direction of the connecting direction of the first and second connector bodies 20 and 40. Accordingly, the engagement slits 50 of the second connector body 40 make no lateral movements during the sliding movement, keeping the straight alignment obtained by the engaged engagement projections 30 and engagement slits 50.

As a result, even when the second connector body 40 is slanted with reference to the first connector body 20 during the initial connecting stage, such a slanted positional relationship is automatically corrected to a straight relationship as the second connector body 40 is pushed into deep in the first connector body 20, and a snug and secure engagement of the first and second connector bodies 20 and 40 is accomplished, and pins 24 and 44 of the first and second connector bodies 20 and 40 are connected properly. The engagement projections 30 and the engagement slits 50 are formed near the side edges 22A' and 42A' of the first and second connector bodies 20 and 40, respectively; accordingly, the connection of the connector bodies 20 and 40 can be made in a stable fashion, and a separation of the connected connecting bodies can be made easily.

What is claimed is:

[1. A connector comprising a first connector element and a second connector element that are coupled together, wherein said first and second connector elements are each formed with a metallic shell;

said first connector element is formed with an engagement projection that projects toward an interior of said first connector element and extends in a direction of depth of said first connector element, a front end of said engagement projection being spaced apart from a front edge of said connector element by a predetermined distance;

said engagement projection is formed by cutting a C-shape slit in a top surface of said metallic shell of said first connector element and bending a tongue formed downwardly; and said second connector element is formed with an engagement slit in said metallic shell that extends in a direction of depth of said metallic shell of said second connector for engaging with said engagement projection formed in said metallic shell of said first connector element.]

[2. The connector according to claim 1, wherein said engagement projection is provided at two locations of said first connector element so as to be parallel to side edges of said first connector element, and said engagement slit is provided at two location of said second connector element so as to be parallel to side edges of said second connector element and to correspond to said two locations of said engagement projections of said first connector element.]

[3. The connector according to claim 1, wherein said engagement projection has a predetermined length in said depth direction and said engagement slit has a predetermined length in said depth direction which is at said predetermined length of said engagement projection.]

*4. An electrical connector comprising:*

*a receptacle connector element having a first metallic shell and adapted to be coupled to a plug connector element having a second metallic shell, the first shell comprising a top plate, a bottom plate, a first side and a second side and having a width W and a depth D, the first and second sides being small relative to the top and bottom plates making the first shell substantially flat;*

*first and second engagement projections formed in the top plate of the first shell that project toward an interior of the receptacle connector element and extend in a direction of a depth of the receptacle connector element, a front end of the first and second engagement projections being spaced apart from a front edge of the receptacle connector element by a predetermined distance, the engagement projections being formed by cutting a C-shape slit in a top surface of the first shell and bending a tongue formed downwardly;*

*an array of electrodes disposed within the first shell and extending in a direction of the depth D between the first and second engagement projections such that there are no electrodes between an engagement projection and its respective side, the array of electrodes being positioned to provide for an insertion cavity around the array of electrodes in an interior of the shell;*

*wherein the first and second engagement projections in the first shell are adapted to engage with first and second engagement slits formed in a top plate of the second shell, the first and second engagement slits starting from a front edge of the top plate and extending in a direction of the depth D.*

*5. An electrical connector comprising:*

*a receptacle connector element having a first shell and adapted to be coupled to a plug connector element having a second shell, the first shell comprising a top plate, a bottom plate, a first side and a second side and having a width W and a depth D, the first and second sides being small relative to the top and bottom plates making the first shell substantially flat;*

*first and second engagement projections formed in the top plate of the first shell that project toward an interior of the receptacle connector element and extend in a direction of a depth of the receptacle connector element, a front end of the first and second engagement projections being spaced apart from a front edge of the receptacle connector element by a predetermined distance;*

*an array of electrodes disposed within the first shell and extending in a direction of the depth D between the first and second engagement projections such that there are no electrodes between an engagement projection and its respective side, the array of electrodes being positioned to provide for an insertion cavity around the array of electrodes in an interior of the shell;*

*wherein the first and second engagement projections in the first shell are adapted to engage with first and second engagement slits formed in a top plate of the second shell.*

*6. The electrical connector of claim 5 wherein each of the projections is in the shape of a tongue that is bent toward the interior of the shell.*

*7. The electrical connector of claim 5 wherein the tongue is formed by cutting an angled C shape into the top plate of the shell.*

*8. The electrical connector of claim 5 wherein each of the projections has a length that is about two thirds of the depth D of the shell.*

*9. The electrical connector of claim 5 wherein the top plate and the bottom plate are made of metal.*

*10. An electrical receptacle connector comprising:*

*a body having a top plate, a bottom plate, a first side and a second side, the body having a width W and a depth D, wherein the first and second sides are smaller relative to the top and bottom plates providing a substantially flat body;*

*an array of electrodes extending in the direction of the depth D inside the body and positioned to provide for an insertion cavity around the array of electrodes in an interior of the body; and*

*first and second projections extending, in a first direction, from the top plate toward the interior of the body and extending, in a second direction, along the depth D, the first projection being disposed at a distance S1 from the first side of the body and the second projection being disposed at a distance S2 from the second side of the body, wherein S1 and S2 are about the same,*

*wherein, the array of electrodes is disposed between the first and second projections such that there are no electrodes between a projection and its respective side, and*

*wherein, the first and second projections facilitate engagement alignment when the receptacle connector mates with a corresponding plug connector.*

*11. The receptacle connector of claim 10 wherein the plurality of projections start at a distance L from a front edge of the first plate.*

*12. The receptacle connector of claim 10 wherein each of the projections is in the shape of a tongue that is bent toward the interior of the body.*

*13. The receptacle connector of claim 12 wherein the tongue is formed by cutting an angled C shape into the top plate of the body.*

*14. The receptacle connector of claim 10 wherein each of the projections has a length that is about two thirds of the depth D of the body.*

*15. The receptacle connector of claim 10 wherein the top plate and the bottom plate are made of metal.*

*16. The receptacle connector of claim 10 further comprising a casing wherein the body is housed, the casing comprising an electronic device.*

*17. The receptacle connector of claim 16 wherein the electronic device is a personal digital assistant.*

*18. The receptacle connector of claim 10 wherein the body is sized to allow insertion of a body of a corresponding plug connector therein.*

*19. An electrical receptacle connector comprising:*

*a body having a top plate, a bottom plate, a first side and a second side, the body having a width W and a depth D, wherein the first and second sides are smaller relative to the top and bottom plates providing a substantially flat body;*

*an array of electrodes extending in the direction of the depth D inside the body; and*

*one or more projections extending, in a first direction, from the top plate toward the interior of the body and extending, in a second direction, along the depth D, each of the one or more projections being disposed a predetermined distance from the first or second side,*

*wherein the array of electrodes is disposed such that there are no electrodes between a projection and its nearest side, and*

*wherein the one or more projections guide the insertion process when the electrical connector mates with another connector.*

*20. The electrical receptacle connector of claim 19 wherein the array of electrodes are positioned to provide for an insertion cavity around the array of electrodes in an interior of the body.*

*21. The electrical receptacle connector of claim 19 wherein the one or more projections start at a distance L from a front edge of the first plate.*

*22. The electrical receptacle connector of claim 19 wherein the one or more projections comprises a first projection at a distance S1 from the first side of the body and a second projection at a distance S2 from the second side of the body, wherein S1 and S2 are about the same.*

*23. The electrical receptacle connector of claim 22 wherein the array of electrodes is formed between the first projection and the second projection.*

*24. The electrical receptacle connector of claim 22 wherein each of the outermost electrodes of the array of electrodes is spaced away from its respective side by a distance that is no less than S1 or S2.*

*25. The electrical receptacle connector of claim 19 wherein each of the one or more projections is in the shape of a tongue that is bent toward the interior of the body.*

*26. The electrical receptacle connector of claim 25 wherein the tongue is formed by cutting an angled C shape into the top plate of the body.*

*27. The electrical receptacle connector of claim 19 wherein each of the one or more projections has a length that is about two thirds of the depth D of the body.*

*28. The electrical receptacle connector of claim 19 wherein the top plate and the bottom plate are made of metal.*

* * * * *

UNITED STATES PATENT AND TRADEMARK OFFICE

CERTIFICATE OF CORRECTION

PATENT NO. : RE43,796 E
APPLICATION NO. : 12/613482
DATED : November 6, 2012
INVENTOR(S) : Yoshifumi Kubota et al.

It is certified that error appears in the above-identified patent and that said Letters Patent is hereby corrected as shown below:

On the Title Page:

At Item [73] Assignee,

"Apple Inc., Cupertino, CA (US)"

should read,

-- Japan Aviation Electronics Industry, Limited, Tokyo (JP) --

Signed and Sealed this
Eighteenth Day of June, 2013

Teresa Stanek Rea

Teresa Stanek Rea
*Acting Director of the United States Patent and Trademark Office*